United States Patent
Woods

(10) Patent No.: US 8,250,536 B2
(45) Date of Patent: Aug. 21, 2012

(54) ANALYSIS OF A LEGACY SOURCE CODE APPLICATION

(75) Inventor: Phillip Steven Woods, Roswell, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1274 days.

(21) Appl. No.: 11/963,966

(22) Filed: Dec. 24, 2007

(65) Prior Publication Data

US 2009/0164984 A1 Jun. 25, 2009

(51) Int. Cl.
*G06F 9/45* (2006.01)
(52) U.S. Cl. .................... 717/123; 717/154
(58) Field of Classification Search .............. 717/123
See application file for complete search history.

(56) References Cited

U.S. PATENT DOCUMENTS

2005/0114840 A1* 5/2005 Zeidman .............. 717/126
2009/0089048 A1* 4/2009 Pouzin ................. 704/10

OTHER PUBLICATIONS

Roy, A Survey on Software Clone Detection Research, Sep. 26, 2007, Queen's University, Technical Report No. 2007-541, p. 1-109, http://techreports.cs.queensu.ca/files/2007-541.pdf.*

* cited by examiner

*Primary Examiner* — Li B Zhen
*Assistant Examiner* — Duy Khuong Nguyen

(57) ABSTRACT

A method of analyzing a legacy source code application is described. The method comprises traversing a generated set of entries of a module hash array, a summary count catalog, and an occurrence location catalog to determine duplicate lines of code of the legacy source code application. The method also comprises determining a duplicate sequence of one or more lines of code with respect to at least one other sequence of one or more lines of code of the legacy source code application based on traversal of the generated set of entries of the module hash array, the summary count catalog, and the occurrence location catalog. The method also comprises storing a match result identifying the determined duplicate sequence and the at least one other sequence.

22 Claims, 8 Drawing Sheets

ANALYSIS OF A LEGACY SOURCE CODE APPLICATION

BACKGROUND

Legacy applications, i.e., existing sets of executable instructions for execution by a processor such as application software, are often written in verbose languages, e.g., common business-oriented language (COBOL), algorithmic language (ALGOL), etc., and comprise a million or more lines of code. These applications have been modified over the course of time, e.g., many years such as decades In many instances, frameworks or libraries which may have been used to curtail the proliferation of repetitive and duplicative code were unavailable or unused by application developers.

Different approaches have been used to decompose legacy computer applications in order to discover duplicate source code within the applications. The information related to the duplicate source code discovery may be used as the basis for further decomposition tasks such as creating reengineering specifications for sections of an examined legacy application which may be revealed during an approach.

Prior approaches used to discover duplicate source code provide hierarchical organization and visualization tools which provide a user with the ability to view various parent-child relationships among legacy application constituent source code artifacts. The tools used may also provide search capabilities for exploring source code interdependencies.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

In accordance with at least some embodiments, a visual representation is created which models a view of legacy source code based upon duplicate code shared between source code modules. In at least some embodiments, duplicate code may be identified first and then used to create a graph of nodes where each node represents a single module and each arc represents the amount of code shared between the nodes.

The created graph(s) of nodes extracted from legacy source code may be complex and patterns created by the relationships may be difficult to understand. Using graph layout algorithms commonly applied to social network analysis, in at least some embodiments nodes may be rearranged into patterns that use the complex relationships to cause the nodes to be moved according to the strength and number of arcs between each node. In at least some embodiments, the use of social network analysis reveals non-obvious relationships between source code modules which may exist due to both intended and unintended duplication of source code as a result of legacy source code modification over time.

Revealing patterns of duplicate code in a legacy code base, i.e., source code comprising a legacy application, provides information related to how the application evolved, what code was duplicated, and where the code was duplicated.

A first question to be answered with respect to legacy application source code comprises a determination of which lines of duplicate code exist between each legacy code module and all other modules of the legacy application. Assuming each line of code within a single module is considered a token, then lines following the token may be considered a sequence. Each sequence of tokens occurring at any arbitrary point within a given module may potentially be repeated in any other module. In at least some embodiments, an objective is to find duplicated sequences of tokens which are shared among the modules within the collection of modules comprising a legacy application. At this level of analysis, efficient and accurate processing of duplicate code may be helpful in at least some embodiments.

A second question to be answered comprises determining how the information may provide insight into patterns of duplication based on discovered duplication. In some legacy applications, the applications may comprise duplicate code sequences which are as small as 6 or 7 lines or as large as thousands of lines or more. For large legacy applications, the applications may comprise thousands of individual instances of duplicate code. At this level of analysis, rendering information to devise strategies for further decomposition may be helpful in at least some embodiments.

Figure 6:
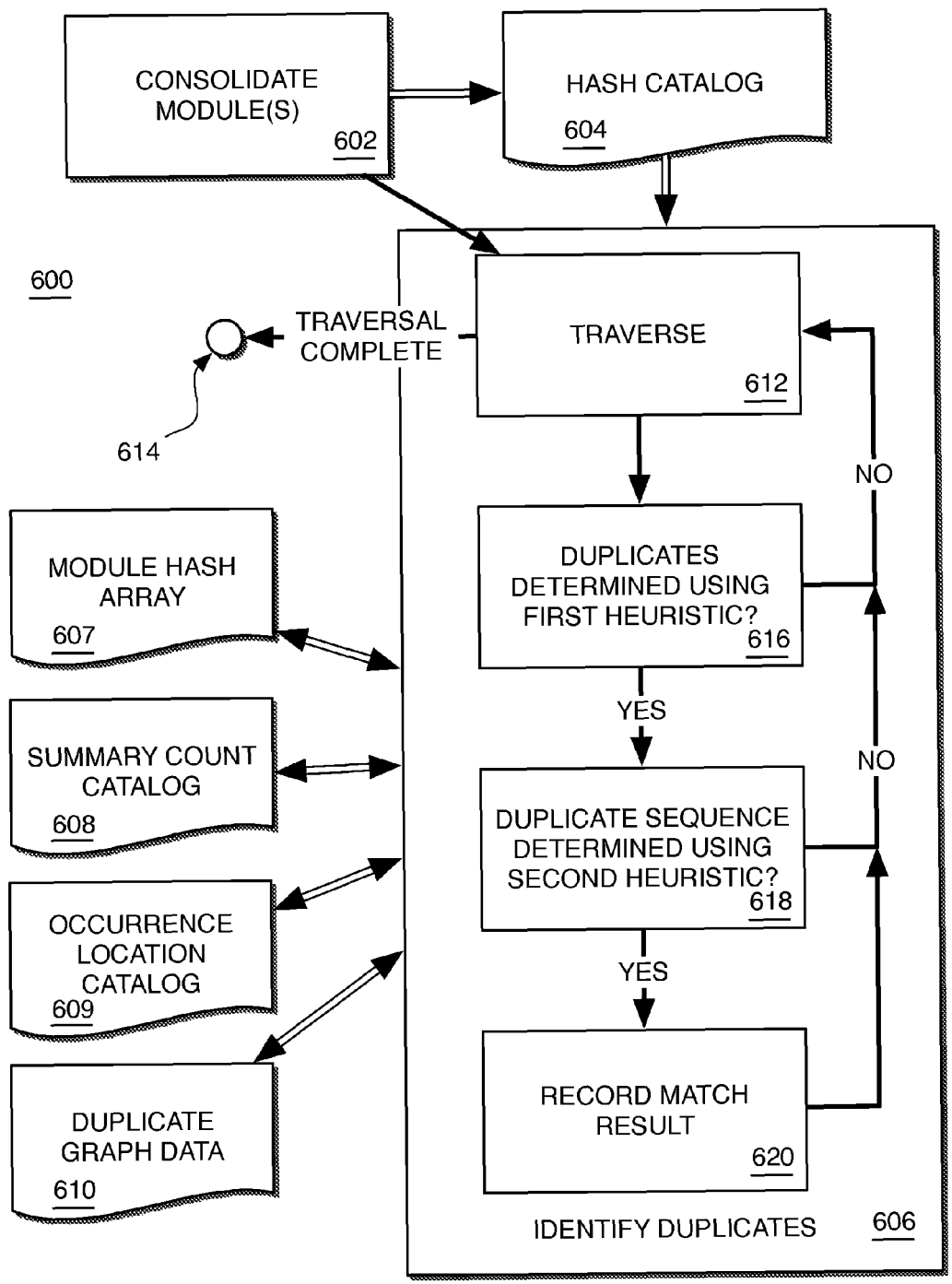
FIG. 6 is a high-level process flow of analyzing legacy source code according to an embodiment of the present invention.

FIG. 6 depicts a high-level process flow 600 of analyzing legacy source code according to an embodiment. Process flow 600 begins at consolidate functionality 602 wherein a processor executing a set of executable instructions consolidates one or more source code modules comprising a legacy application into a file, i.e., a hash catalog 604. In at least some embodiments, catalog 604 may comprise one or more files and/or different data structures such as to implement a representation of the information to support the functionality.

Execution of consolidate functionality 602 by the processor causes the creation of catalog 604 by proceeding line-by-line through each source code module and converting logical comparisons into identical tokens. For example, source code comprising a comparison such as less than or equal to" ("<="), greater than or equal to" (">="), or equal to" ("==") may be converted into a single token or representative value, e.g., "%". In accordance with the embodiment, the encompassing line of code is similar among the differing comparisons with the exception of the logical comparison operator.

In at least some embodiments, syntactically insignificant lines of source code are ignored, e.g., comments or blank lines. Additionally, execution of consolidate functionality 602 causes the conversion of a line of code into a hash value representing the line of code. Conversion of the line of code into a hash value improves processing efficiency with respect to processing each line of code in native form.

For each line of code processed, an entry is added to catalog file 604. Each entry may comprise a file index number referring to the source code module from which the line of code processed originated, a relative line number corresponding to the line number from the original legacy source code to which the entry refers, and a hash value of the line of source code. In this manner, the hash value of an entry is stored along with information identifying from which module and line of source code the entry originated.

Figure 1:
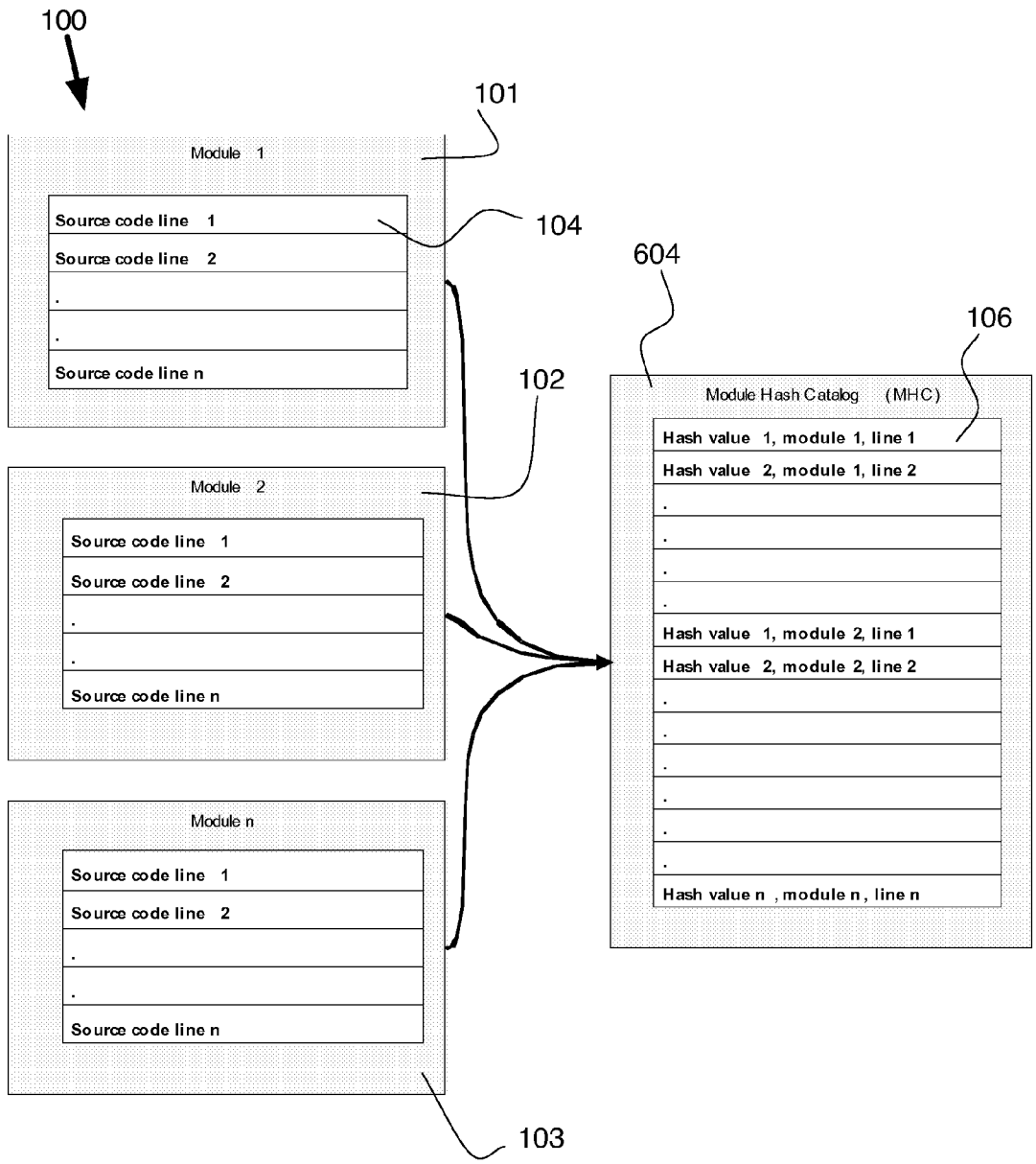
FIG. 1 is an example of extracting source code data according to an embodiment of the present invention.

FIG. 1 depicts an example of extracting source code data from a body of one or more source code modules 101, 102, 103 of a legacy application 100. According to an embodiment, source code lines are converted to a hashed value and a module identifier, e.g., a module number, and line number for each source code line are recorded. One or more of the hashed value, the module identifier and the line number may be used by a duplicate code detection functionality to track back to the original source code location within the legacy application.

For ease of reference and clarity, a single source line of code and corresponding catalog entry are described, however, more than one source line of code and entry may exist with respect to a given legacy application. For example, first source code module 101 comprises at least a first line of source code 104. As a result of execution of consolidate functionality 602, a first catalog entry 106 is added to catalog 604. First catalog entry 106 comprises a hash value based on performing a hash of the first line of source code, a module identifier, and a line number relative to the identified module from which the line of source code originated.

Returning to FIG. 6, the flow 600 proceeds to identify duplicates functionality 606 wherein a processor executing a set of executable instructions identifies and records duplicate code within the legacy source code module(s) based on the hash catalog 604 entries.

In at least some embodiments, the processor reads catalog 604 entries and creates a module hash array (MHA) 607, a summary count catalog SCC 608, and an occurrence location catalog 609. In at least some embodiments, module hash array 607 is an array based on hash catalog 604. In at least some embodiments, the processor uses catalog 604 in place of MHA 607 and creates SCC 608 and OLC 609 based on the catalog. In accordance with an embodiment lacking MHA 607, one or more pointers or other mechanisms are used to traverse catalog 604 according to flow 600.

Summary count catalog 608 stores a summary count of the number of occurrences of a line of source code from the legacy source code modules 101, 102, 103. The summary count stored is based on the number of times a particular hash value occurs in MHA 607. For example, unique lines of code have a count value equal to one.

Occurrence location catalog (OLC) 609 stores a mapping from a given hash value, i.e., related to an entry in MHA 607, to zero or more MHA entries having a matching hash value. In at least some embodiments, each matching occurrence may indicate the start of a duplicate sequence of lines of code.

Figure 2:
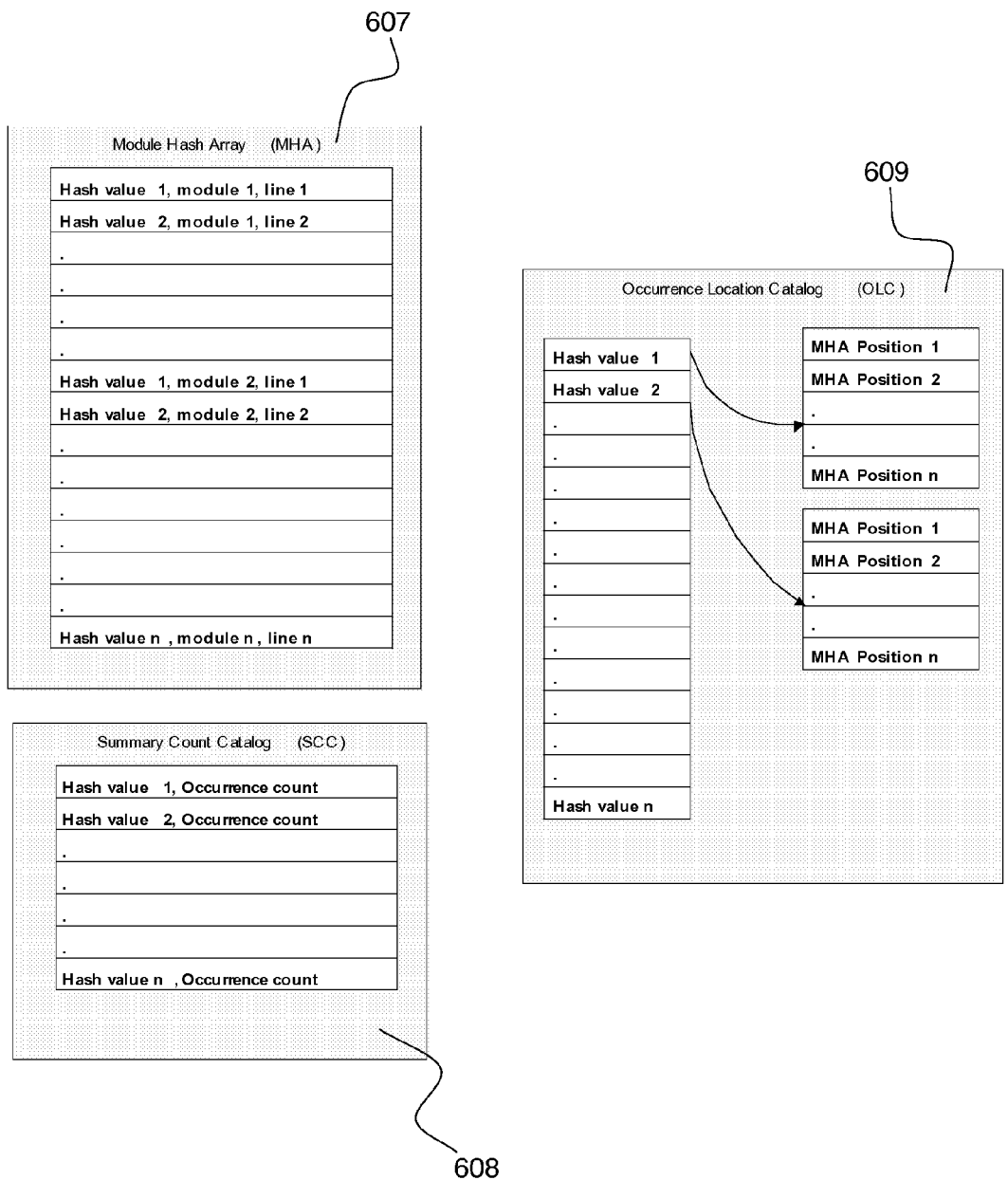
FIG. 2 is an example of data structures according to an embodiment of the present invention.

FIG. 2 depicts an example of MHA 607, summary count catalog 608, and OLC 609.

In at least some embodiments, the processor also reads and writes to a duplicate graph data file 610. Duplicate graph data file 610 comprises duplicate code information organized to allow display using graph visualization techniques. File 610 is organized to enable association of duplicate source code using graph theory in which:

nodes of the graph comprise a module number and other attributes describing the module location and file attributes; and arcs of the graph comprise lines shared between two associated nodes.

Figure 3:
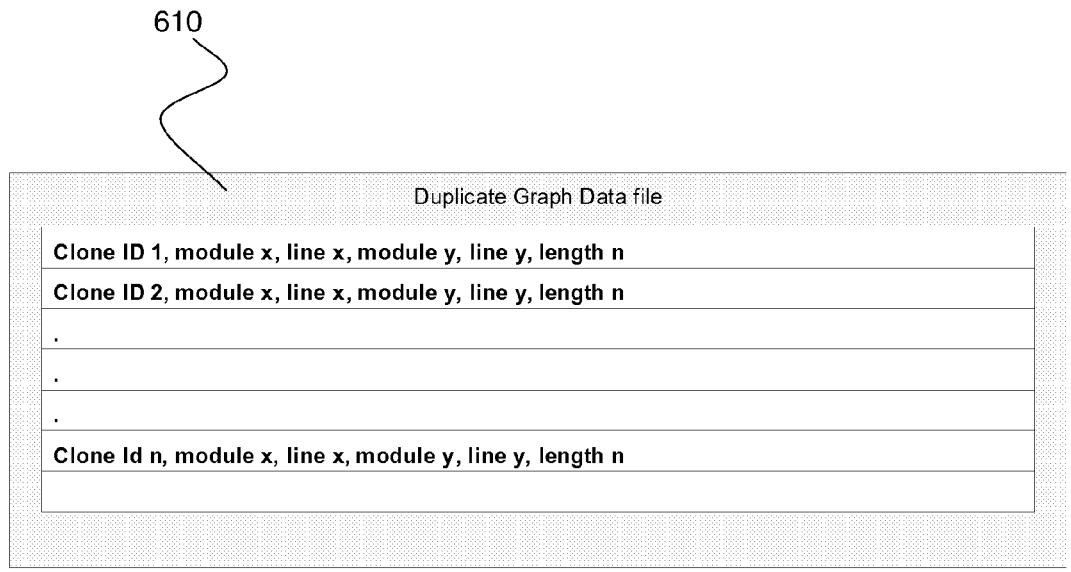
FIG. 3 is an example of duplicate graph data according to an embodiment of the present invention.

FIG. 3 depicts an example duplicate graph data file 610.

Returning to FIG. 6, execution of traverse functionality 612 causes the processor to traverse the entries in MHA 607 and proceed to node 614 upon traversal of the entries. For each entry traversed, the flow proceeds to first heuristic functionality 616 and determines based on the content of a corresponding entry in SCC 608, i.e., based on the hash value and occurrence count, whether more than one occurrence of a line of code exists. If the count value equals one, the flow returns to traverse functionality 612 to either increment to a next entry in MHA 607 or proceed to node 614.

If the count value is greater than one, first heuristic functionality 616 causes the processor to determine whether the count value for the entry exceeds a predetermined count threshold. In at least some embodiments, the predetermined count threshold comprises a value based on a percentage of the total number of lines of code of the legacy application, e.g., 0.1%, 0.5%, etc. of the total legacy source code. If the count value fails to exceed the predetermined count threshold, the flow returns to traverse functionality 612 to either increment to a next entry in MHA 607 or proceed to node 614. If the count value exceeds the predetermined count threshold, the entry is determined to be a possible parent hash value which may have duplicate hashes in the same or other legacy source code modules and the flow proceeds to second heuristic functionality 618.

For each hash value of an entry in MHA 607 which passes the first heuristic functionality 616, entry hash values subsequent to the passing entry hash value are compared with entry hash values subsequent to the mapped entries of OLC 609. That is, the sequence of hash values subsequent to the passing hash value are compared with the sequence of hash values subsequent to the mapped entry hash values of OLC 609. The comparison continues until a non-matching hash value is determined which breaks the sequence based on a second heuristic. In at least some embodiments, a running count of the number of non-matching hash values (non-match count) is maintained with respect to a particular starting entry. In at least some embodiments, a running count of the number of entries of legacy source code traversed (sequence count).

Figure 7:
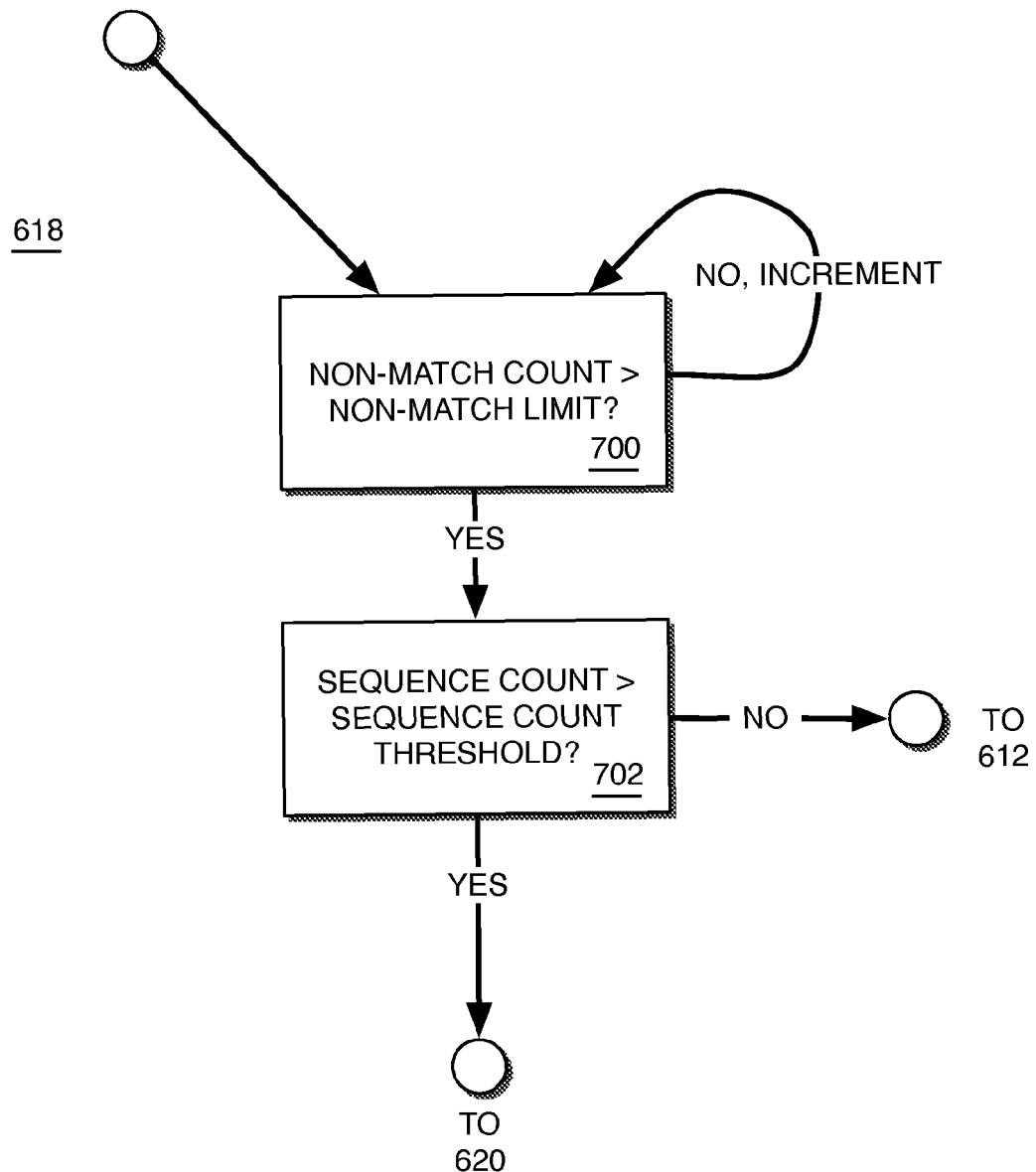
FIG. 7 is a detail portion of determining a duplicate sequence according to an embodiment of the present invention.

FIG. 7 depicts an example of the second heuristic according to an embodiment. According to the second heuristic, a configurable predetermined number of non-matches (predetermined non-match limit) between hash values are permitted prior to discontinuing sequence advancement. In at least some embodiments, the predetermined non-match limit may comprise a percentage value applied with respect to the total number lines of code of the legacy application. In at least some embodiments, the percentage value of the predetermined non-match limit may comprise a percentage value with respect to the number of entries of either MHA 607 or SCC 608. Additionally, a sequence of lines of code is determined as a duplicate code sequence if the matching hash value entries exceeds configurable predetermined threshold value of number of matches in a sequence (predetermined sequence threshold).

The flow 618 proceeds to exceed limit determination functionality 700 wherein the processor executing a set of executable instructions compares the non-matching count with the predetermined non-match limit. If the non-match count fails to exceed the predetermined non-match limit, the flow returns to exceed limit determination functionality 700 and the next hash value entries are compared.

If the non-match count exceeds the predetermined non-match limit, the flow proceeds to exceed sequence threshold determination functionality 702 wherein the processor executing a set of executable instructions compares the sequence count to the predetermined sequence count threshold. In at least some embodiments, the value of the predetermined sequence count threshold may comprise a different number for a different application type and/or source code program language.

If the sequence count fails to exceed the predetermined sequence count threshold, the sequence is determined to not comprise a duplicate code sequence and the flow proceeds to return to traverse functionality 612.

If the sequence count exceeds the predetermined sequence count threshold, the sequence is determined to comprise a duplicate code sequence and the flow proceeds to a record match result functionality 620.

During execution of record match result functionality 620, for each matching sequence of code, the processor stores the resulting information, e.g., as depicted with respect to the duplicate graph data file 610. That is, for each matching sequence, the parent entry module identifier and line number are stored along with a child entry module identifier, line number, and the length of the matching sequence (sequence count) for the particular entry. The child entry line number is the line number of the initial entry hash value corresponding to the parent entry.

The flow 600 proceeds to return to traverse functionality 612 to either increment to a next entry in MHA 607 or proceed to node 614.

Figure 4:
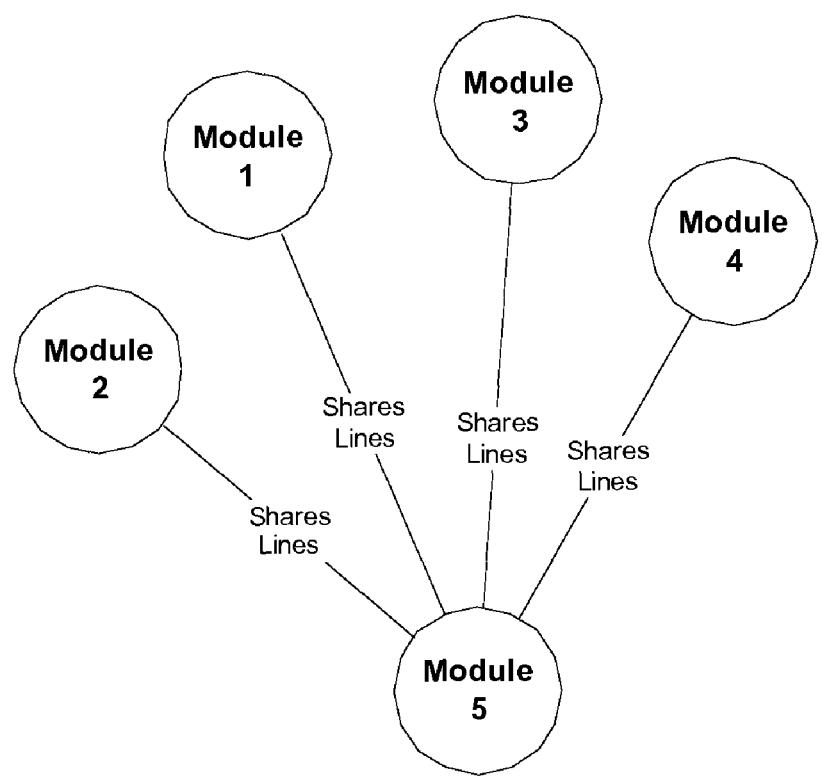
FIG. 4 is an example visual representation of duplicate code according to an embodiment of the present invention.

In accordance with a further embodiment of the present invention, the relationships between the nodes and thus the source code modules may be understood through a visualization allowing the node-arc relationships to control the presentation of the nodes. FIG. 4 depicts a graph of a representative set of nodes and FIG. 5 depicts a graph of a larger representative set of nodes than FIG. 4.

Figure 5:
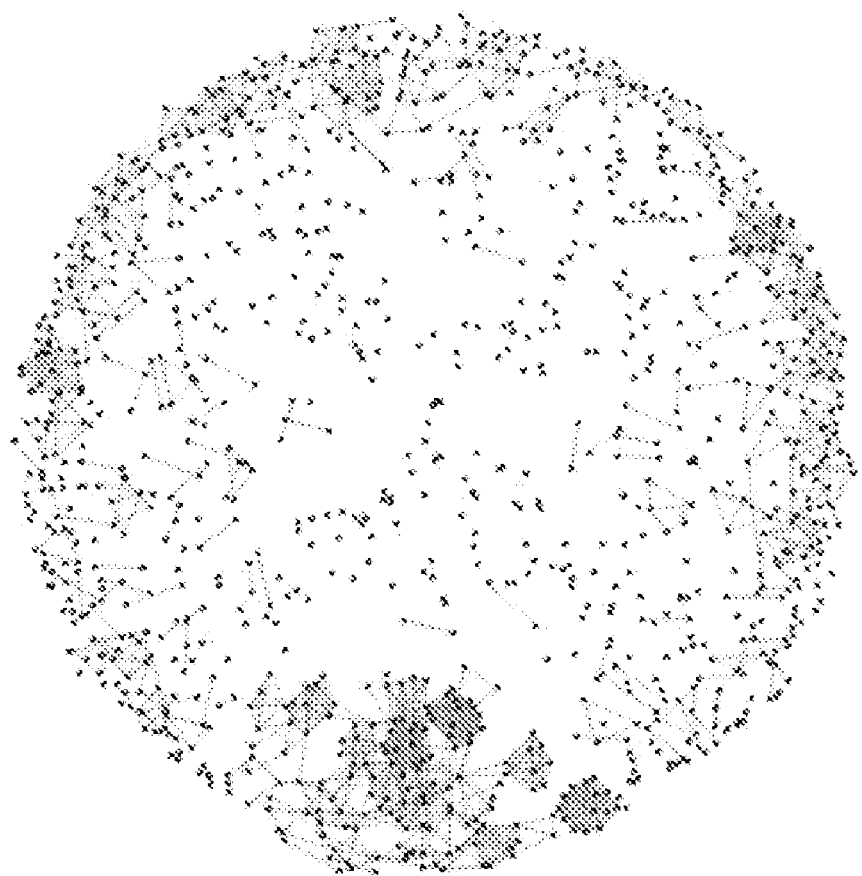
FIG. 5 is an example visual representation of duplicate code according to another embodiment.

Visualization graphs, e.g., as depicted in FIGS. 4 and 5, provide a mechanism of revealing patterns of code sharing that affect modernization effort estimations.

Decomposition tasks may be effectively organized by basing the visualization on the relationships identified through the foregoing functionality rather than relationships established by syntactical constructs found within the code.

Figure 8:
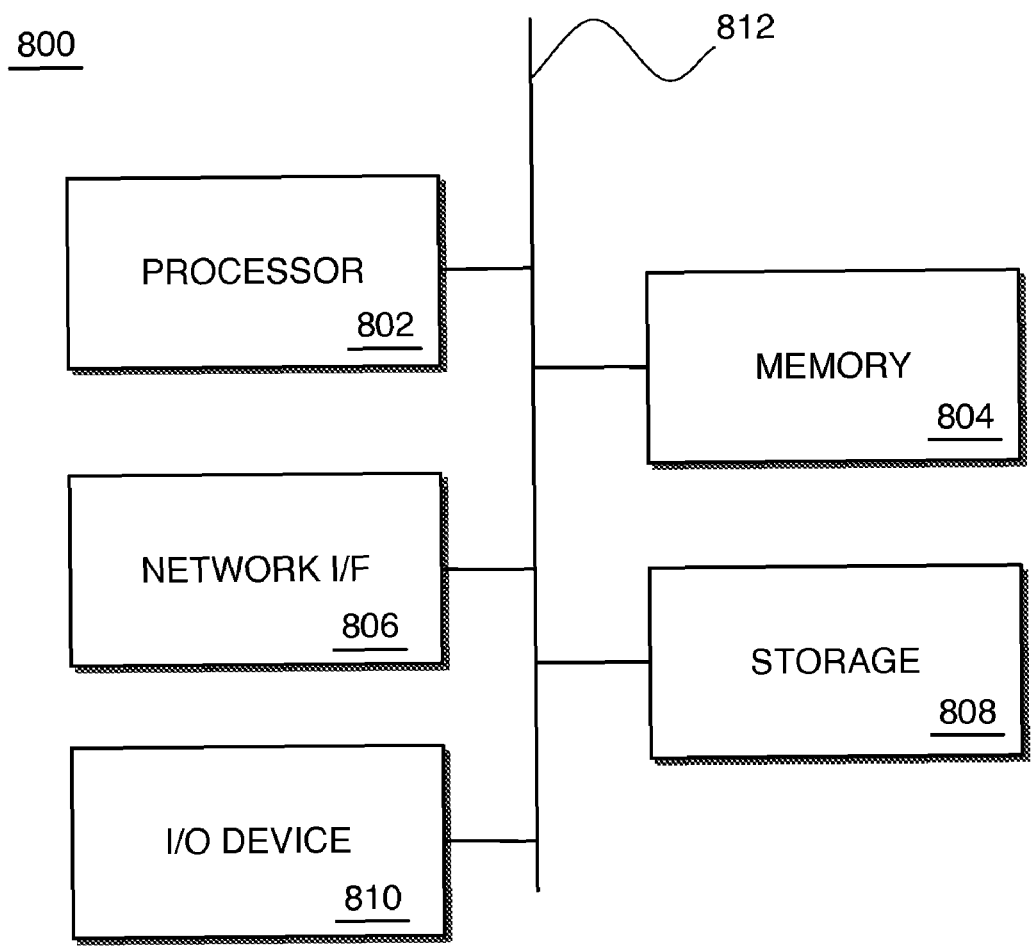
FIG. 8 is a high-level functional block diagram of a computer system usable in conjunction with the legacy source code analysis functionality according to an embodiment.

FIG. 8 depicts a high-level functional block diagram of a computer system 800 usable in conjunction with functionality 600 according to an embodiment. Computer system 800 comprises a processor 802, a memory 804, a network interface (I/F) 806, a storage 808, and an input/output device 810 communicatively coupled via a bus 812 or other interconnection communication mechanism.

Memory 804 (also referred to as a computer-readable medium) may comprise a random access memory (RAM) or other dynamic storage device, coupled to the bus 812 for storing communication data, and instructions to be executed by processor 802, e.g., functionality 600. Memory 804 also may be used for storing temporary variables or other intermediate information during execution of instructions to be executed by processor 802. Memory 804 may also comprise a read only memory (ROM) or other static storage device coupled to the bus 812 for storing static information and instructions for the processor 802.

Network I/F 806 comprises a mechanism for connecting to another device. In at least some embodiments, computer system 800 may not comprise network I/F 806.

A storage device (storage 808), such as a magnetic disk or optical disk, may also be provided and coupled to the bus 812 for storing data such as the sequence count, the non-match count, the predetermined non-match limit, the predetermined sequence threshold, and instructions.

I/O device 810 may comprise an input device, an output device and/or a combined input/output device for enabling user interaction with functionality 600. An input device may comprise, for example, a keyboard, keypad, mouse, trackball, trackpad, and/or cursor direction keys for communicating information and commands to processor 802. An output device may comprise, for example, a display, a printer, a voice synthesizer, etc. for communicating information to a user.

The functions of a method described in connection with the embodiments disclosed herein may be embodied in hardware, software, or a combination thereof. Software comprising instructions for execution may reside in a computer-readable medium comprising volatile and/or non-volatile memory, e.g., a random access memory, a read only memory, a programmable memory, a hard disk, a compact disc, or another form of storage medium readable, directly or indirectly, by a processing device.

What is claimed is:

1. A method of analyzing a legacy source code application, comprising:
consolidating one or more legacy source code modules;
generating an indexed catalog comprising one or more index entries, each index entry corresponding to a line of legacy source code from the one or more legacy source code modules;
generating an occurrence location catalog based on the generated indexed catalog and comprising a mapping between a hash value derived from a corresponding line of legacy source code and at least one reference to a line of legacy source code having an equivalent hash value;
generating a summary count catalog based on the occurrence location catalog and comprising one or more count entries, each count entry corresponding to a hash value of the line of legacy source code and comprising an occurrence count indicative of the number of lines of legacy source code having an equivalent hash value, wherein each index entry of the generated indexed catalog comprises a hash value derived from the line of legacy source code, and each index entry further comprises a legacy source code module identifier and the line number of the line of legacy source code;
generating a duplicate results file based on the generated summary count catalog and comprising one or more duplicate result entries, each duplicate result entry corresponding to a sequence of one or more lines of legacy source code matching a second sequence of one or more lines of legacy source code in one or more legacy source code modules.

2. The method of claim 1, wherein each duplicate result entry of the generated duplicate results file comprises a first legacy source code module identifier, a corresponding first line number, a second legacy source code module identifier, a corresponding second line number, and a sequence length.

3. The method of claim 2, wherein the first and second legacy source code module identifiers are the same.

4. The method of claim 1, wherein the generating a duplicate results file comprises determining one or more duplicate lines of legacy source code by application of a first heuristic.

5. The method of claim 4, wherein application of the first heuristic comprises determining if the occurrence count exceeds a predetermined count threshold.

6. The method of claim 5, wherein the predetermined count threshold comprises a value based on a percentage of the total number of lines of source code of the legacy application.

7. The method of claim 4, wherein the generating a duplicate results file further comprises determining a sequence of one or more lines of legacy source code matching a second sequence of one or more lines of legacy source code in one or more legacy source code modules by application of a second heuristic.

8. The method of claim 7, wherein application of the second heuristic comprises determining if a count of non-matching lines of legacy source code exceeds a predetermined non-match limit.

9. The method of claim 8, wherein application of the second heuristic comprises determining if a count of the lines of the sequence of one or more lines of legacy source code exceeds a predetermined sequence threshold.

10. The method of claim 9, wherein the determining if a count of the lines of the sequence of one or more lines of legacy source code exceeds a predetermined sequence threshold is performed for each determination wherein the count of non-matching lines of legacy source code exceeds the predetermined non-match limit 11. The method of claim 9, wherein the predetermined sequence threshold is determined based on at least one of an application type.

12. The method of claim 10, wherein the predetermined non-match limit comprises a value based on a percentage of a number of entries of the summary count catalog.

13. The method of claim 1, comprising generating a duplicate graph data file including duplicate code information organized for display and to enable association of duplicate source code as a graph.

14. The method of claim 13, wherein nodes of the graph comprise a module number and other attributes describing the module location and file attributes.

15. The method of claim 13, wherein arcs of the graph comprise lines shared between two associated nodes.

16. The method of claim 10, wherein the predetermined non-match limit comprises a value based on a percentage of the total number of lines of source code of the legacy application.

17. A non-transitory computer-readable medium storing instructions which, when executed by a processor, cause the processor to perform the method of claim 1.

18. A method of analyzing a legacy source code application, comprising:
generating an occurrence location catalog based on a generated indexed catalog and comprising a mapping between a hash value derived from a corresponding line of legacy source code and at least one reference to a line of legacy source code having an equivalent hash value;
generating a summary count catalog based on the occurrence location catalog and comprising one or more count entries, each count entry corresponding to a hash value of a line of legacy source code and comprising an occurrence count indicative of a number of lines of legacy source code having an equivalent hash value wherein each index entry of the generated indexed catalog comprises a hash value derived from the line of legacy source code, and each index entry further comprises a legacy source code module identifier and the line number of the line of legacy source code;
traversing a generated set of entries of a module hash array, the summary count catalog, and the occurrence location catalog to determine duplicate lines of code of the legacy source code application;
determining a duplicate sequence of one or more lines of code with respect to at least one other sequence of one or more lines of code of the legacy source code application based on traversal of the generated set of entries of the module hash array, the summary count catalog, and the occurrence location catalog; and
storing a match result identifying the determined duplicate sequence and the at least one other sequence.

19. The method of claim 18, wherein the duplicate lines of code are determined based on application of a first heuristic.

20. The method of claim 19, wherein the duplicate sequence of one or more lines of code is determined based on application of a second heuristic.

21. The method of claim 18, comprising:
traversing a hash catalog to generate the module hash array, the summary count catalog, and the occurrence location catalog.

22. The method of claim 19, comprising:
consolidating modules of a legacy source code application to form the hash catalog.

* * * * *

UNITED STATES PATENT AND TRADEMARK OFFICE
CERTIFICATE OF CORRECTION

| | | |
|---|---|---|
| PATENT NO. | : 8,250,536 B2 | Page 1 of 1 |
| APPLICATION NO. | : 11/963966 | |
| DATED | : August 21, 2012 | |
| INVENTOR(S) | : Phillip Steven Woods | |

It is certified that error appears in the above-identified patent and that said Letters Patent is hereby corrected as shown below:

In the Claims:

In column 7, line 21, in Claim 10, delete "limit" and insert -- limit. --, therefor.

Signed and Sealed this
Eighth Day of January, 2013

David J. Kappos
*Director of the United States Patent and Trademark Office*